United States Patent
Bhukania et al.

(10) Patent No.: US 7,796,716 B2
(45) Date of Patent: Sep. 14, 2010

(54) ELIMINATING NARROWBAND INTERFERENCE IN A RECEIVER

(75) Inventors: Bijoy Bhukania, Bangalore (IN); Raghu Ganesan, Bangalore (IN); Naga Saty Srikanth Puvvada, Bangalore (IN); Sthanunathan Ramakrishnan, Bangalore (IN); Jaiganesh Balakrishnan, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 629 days.

(21) Appl. No.: 11/828,349

(22) Filed: Jul. 26, 2007

(65) Prior Publication Data

US 2008/0043888 A1    Feb. 21, 2008

Related U.S. Application Data

(60) Provisional application No. 60/822,712, filed on Aug. 17, 2006, provisional application No. 60/822,708, filed on Aug. 17, 2006.

(51) Int. Cl.
| | |
|---|---|
| *H03D 1/06* | (2006.01) |
| *H03K 5/01* | (2006.01) |
| *H03K 6/04* | (2006.01) |
| *H04B 1/10* | (2006.01) |
| *H04L 1/00* | (2006.01) |
| *H04L 25/08* | (2006.01) |

(52) U.S. Cl. .................. 375/346; 375/350; 375/285; 375/284; 375/231; 455/296; 455/303; 455/306

(58) Field of Classification Search .......... 375/346, 375/350, 285, 284, 229, 230, 331; 455/296, 455/303, 306
See application file for complete search history.

(56) References Cited

U.S. PATENT DOCUMENTS

| | | | |
|---|---|---|---|
| 6,426,983 | B1 | 7/2002 | Rakib et al. |
| 6,477,196 | B1 | 11/2002 | Swanke et al. |
| 6,577,670 | B1 | 6/2003 | Roberts |
| 6,807,222 | B1 | 10/2004 | Widdowson |
| 2002/0006174 | A1 | 1/2002 | Nafie et al. |
| 2002/0057726 | A1 | 5/2002 | Williams et al. |
| 2006/0215795 | A1* | 9/2006 | Nafie et al. .......... 375/346 |

FOREIGN PATENT DOCUMENTS

| | | |
|---|---|---|
| EP | 812069 B1 | 12/1996 |
| WO | 0046929 A1 | 8/2000 |

* cited by examiner

*Primary Examiner*—Phuong Phu
(74) *Attorney, Agent, or Firm*—Steven A. SHaw; W. James Brady; Frederick J. Telecky, Jr.

(57) ABSTRACT

A wireless device receives an input signal representing a signal of interest (e.g., one or more portions of a packet) on a wireless medium. The input signal may, in addition, contain narrowband interference signals. The wireless device removes the signal of interest from the input signal to produce a residue signal, and analyzes the residue signal to determine the presence of any interference bands in which narrowband interference signals may be present. The wireless device then removes the detected interference bands from the input signal. The residue signal may reveal the presence of interference signals, which might otherwise be hard to distinguish in the input signal. Thus, interference signals with power levels much lower than the power of the signal of interest may be detected and removed.

18 Claims, 6 Drawing Sheets

ELIMINATING NARROWBAND INTERFERENCE IN A RECEIVER

RELATED APPLICATION

The present application claims priority from the following co-pending US provisional patent applications, which are both incorporated in their entirety into the present application:

Application Ser. No.: 60/822,708 filed on Aug. 17, 2006, naming as inventors Bhukania et al, entitled, "DETECTION OF NARROWBAND INTERFERENCE, AND ROBUST CHANNEL ESTIMATION AND PACKET DECODING"; and Application Ser. No.: 60/822,712 filed on Aug. 17, 2006, naming as inventors Bhukania et al, entitled, "NARROWBAND INTERFERENCE REJECTION METHOD AND APPARATUS FOR ROBUST PACKET DETECTION".

BACKGROUND

1. Field of the Invention

The present invention relates generally to receivers used in various systems, and more specifically to techniques for eliminating narrow band interference in signals received by a receiver.

2. Related Art

A receiver generally receives packets (communication/data) over a corresponding medium. The band of frequencies occupied by a signal representing a packet is generally termed as receive bandwidth, which is the signal band of interest for the receiver.

In addition to a signal of interest (representing the content of a packet, or portions of it), a receiver may also receive an interference signal (also referred to in some instances below as an interference component) contained within the band of interest.

Narrow-band interference signal is an example of such an interference signal, and is generally an interference signal whose signal bandwidth is very small compared to the band of interest of the receiver. The interference signals can originate from various sources such as other radio transmissions, leakages, etc.

As an illustration, an 802.11 WLAN wireless receiver has a band of interest of about 20 MHz (mega Hertz). Narrow band interference signals such as bluetooth signals (bandwidth 1 MHz), harmonics of GSM signals and other continuous wave (CW) signals may be present within the 20 MHz band of the WLAN wireless receiver.

Narrowband interference signals generally degrade a receiver's performance, causing undesirable effects such as greater error in decoding data packets, reducing overall throughput in a network in which the receiver operates etc., as is well know in the relevant arts. Thus, it is generally desirable to eliminate narrowband interference signals from a received signal.

BRIEF DESCRIPTION OF THE DRAWINGS

The present invention will be described with reference to the following accompanying drawings, which are described briefly below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

Overview

A receiver provided according to an aspect of the present invention subtracts a signal of interest from an input signal to generate a residue signal, and determines any interference bands in which the narrowband interference signal is present in the residue signal. The receiver removes frequency components corresponding to the interference band from the input signal to eliminate the narrowband interference component. The signal thus generated may be used for subsequent processing as suited for the specific environment. In an embodiment(s) described below in further detail, the receiver receives signals on a wireless medium and is thus termed as a wireless receiver.

According to one more aspect of the present invention, such a technique is applied to a preamble portion of a packet encoded as the signal of interest. In one embodiment, a signal representing training symbols is removed from a signal portion (of the input signal) encoding the training symbols to form a residue signal. An alternative embodiment takes advantage of repetitive sequence in the preamble portion. A first signal portion representing one sequence may be subtracted from a second signal portion representing the same sequence to form the residue signal. Once the residue signal is generated, further processing to eliminate the interference signal may be performed as described above (for both embodiments).

According to yet another aspect of the present invention, narrowband interference is removed from a payload portion of signal encoding a packet. In an embodiment, the residue signal is generated as a deviation of a received symbol (or the corresponding signal portion) from the ideal value according to a modulation technique used at a transmitter. The residue signal is processed similarly as noted above.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well known structures or operations are not shown in detail to avoid obscuring the features of the invention.

2. Example Environment

Figure 1:
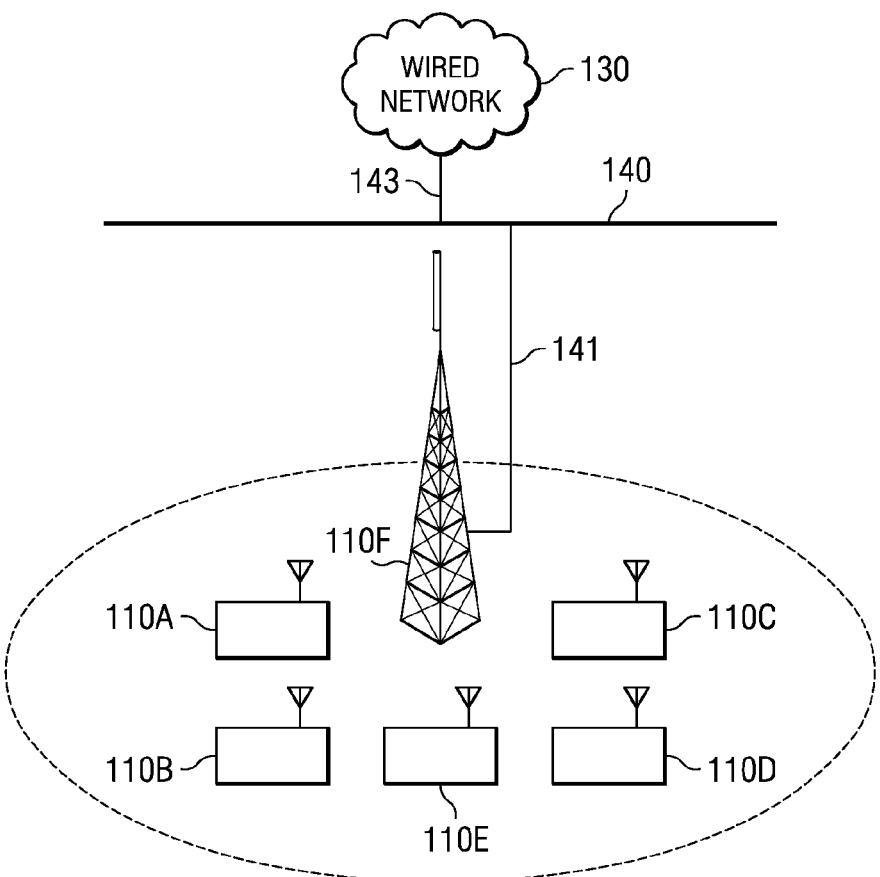
FIG. 1 is a block diagram illustrating an example environment in which several aspects of the present invention may be implemented.

FIG. 1 is a block diagram illustrating an example environment in which several aspects of the present invention may be implemented. The diagram is shown containing wireless devices 110A-110E, access point (AP) 110F, wired network 130 and wired network backbone 140. In the example environment shown in FIG. 1, the respective components may operate consistent with the 802.11a/g WLAN standard. However, at least some of the features can be implemented in various other environments (e.g., wire-based) as well, as will be apparent to one skilled in the relevant arts by reading the disclosure provided herein. Each component of FIG. 1 is described in detail below.

Each of wireless devices 110A-110E may operate as a wireless transceiver (transmit and receive), and may communicate with each other over a wireless medium either directly or via AP 110F. Wireless devices 110A-110E may be any electronic/computing device (mobile or fixed, such as laptops, desktops, Personal Digital Assistants etc.) equipped with a wireless network interface card (or similar hardware) that enables wireless communication.

AP 110F is connected by a wired medium (141) to wired network backbone 140, which in turn is connected to wired network 130 via wired medium 143. AP 110F provides wireless devices 110-A through 110-E connectivity with each other, and also with wired network 130. AP 110F may also contain a transceiver for communicating on the wireless medium with various wireless devices.

Wireless devices 110A-110E, and AP 110F may communicate (receive and transmit) with each other on a shared frequency band such as the 2.4 GHz (or 5.1 GHz) band specified by the 802.11a/g WLAN standard. The devices could be operating in the same channel or different channels (adjacent or overlapping) within the shared band.

Wireless devices 110A-110E and AP 110F may communicate through packets using wireless medium. In general, each packet may be viewed as containing a header and a payload, with the payload representing the data of interest sought to be transported and the header representing the signal preceding the data of interest (for protocol reasons, generally).

As noted above, reception of interference signals generally degrades the performance of wireless receiver, typically causing higher error rates in decoding data packets and other undesirable effects noted above. Several aspects of the present invention detect and eliminate such narrowband interference as described below with examples.

3. Eliminating Interference

Figure 2:
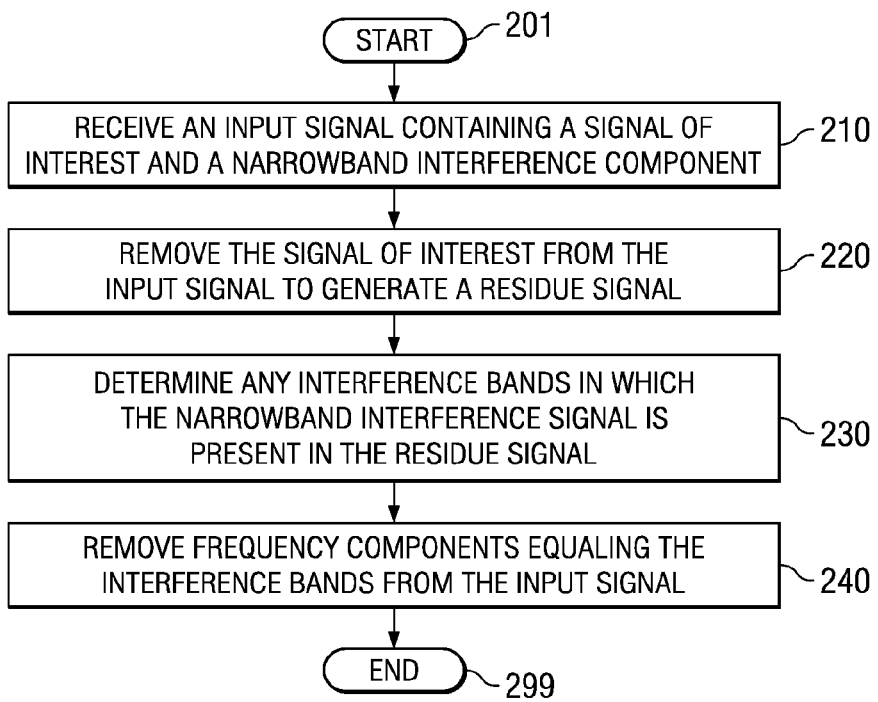
FIG. 2 is a flowchart illustrating the manner in which narrowband interference is removed from an input signal according to several aspects of the present invention.

FIG. 2 is a flowchart illustrating the manner in which narrowband interference is eliminated according to several aspects of the present invention. The flowchart is described with respect to FIG. 1, and in relation to wireless device 110A, merely for illustration. However, various features can be implemented in other environments and other components. Furthermore, the steps are described in a specific sequence merely for illustration.

Alternative embodiments in other environments, using other components, and different sequence of steps can also be implemented without departing from the scope and spirit of several aspects of the present invention, as will be apparent to one skilled in the relevant arts by reading the disclosure provided herein. The flowchart starts in step 201, in which control passes immediately to step 210.

In step 210, wireless device 110A receives an input signal containing a signal of interest and a narrowband interference component. The interference component lies within a band of interest of the signal of interest, with the bandwidth (band of frequencies, or "interference bands") of the (narrowband) interference component being much smaller than the band of interest. Control then passes to step 220. The interference band is generally a fraction of the band of interest, and the magnitude of the interference band depends on the specific environment/implementation, though values (of the denominator) in the range of 5-20 are typical in WLAN environment. [I do not understand the last sentence; if you meant that signal-to-interference ratio (SIR) is in the range of 5 to 20 dB, then you are right.]

In step 220, wireless device 110A removes the signal of interest from the input signal to generate a residue signal. Such a residue signal can be generated using one of several techniques, some of which are described in sections below. The residue signal may have different strengths (e.g., power levels) in different (frequency) points/bands within the band of interest. Control then passes to step 230.

In step 230, wireless device 110A determines any interference bands in which the narrowband interference signal is present in the residue signal. For example, wireless device 110A may determine if the residue signal has a power level above a threshold level in any portion of the band of interest. The threshold value may be determined a priority based on the operating environment, strength of signals, prior knowledge of possible interference sources, etc., potentially based on experimental data. A power level greater than a threshold level generally indicates the presence of a narrow band interference component (in the corresponding band). Wireless device 110A may alternatively use other techniques to determine if the residue signal contains the interference component, as described below. Control then passes to step 240.

In step 240, wireless device 110A removes frequency components equaling the interference bands from the input signal. Thus, wireless device 110A eliminates the interference component from the input signal. Control then passes to step 299, in which the flowchart ends.

It may be appreciated from the description above that the residue signal may reveal the presence of an interference component, which might otherwise be hard to distinguish. Thus, the approach described above may be used even to detect interference signals whose power is much lower than the power of the signal of interest, as noted above.

Wireless device 110A may repeat the steps described above for each portion of an input signal received (for example, a preamble portion, a payload portion, for each symbol interval, etc), and/or at periodic intervals to detect and remove a narrowband interference signal.

As noted above, wireless device 110A estimates the signal of interest and subtracts it from the received signal. The signal of interest may correspond to one or more of different portions of a packet received by wireless device 110A. Thus, several scenarios may exist, and wireless device 110A may use a correspondingly different approach to estimate the signal of interest and to subtract the signal of interest from the received signal, so as to operate on a residue signal to detect interference. The description is accordingly continued with an illustration of a first approach in which wireless device 110A operates on a preamble portion (signal of interest) of a packet to detect the presence of a narrow-band interference.

4. Detecting Interference Signal in the Preamble

Figure 3:
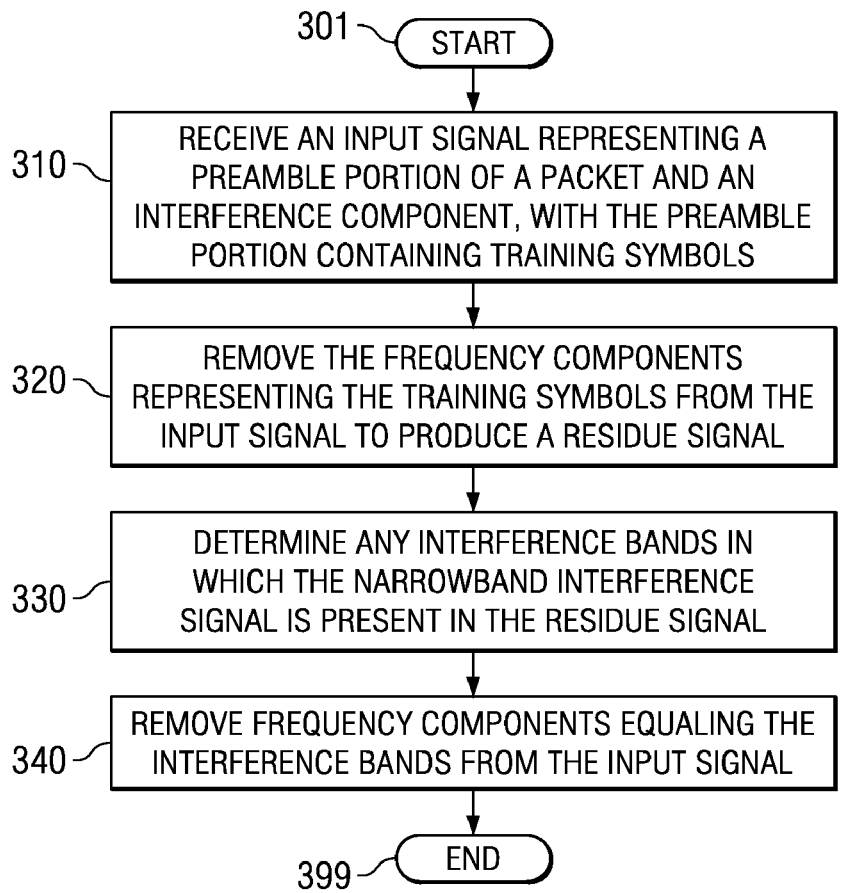
FIG. 3 is a flowchart illustrating the manner in which narrowband interference during a preamble portion of a packet is removed in an example approach according to several aspects of the present invention.

FIG. 3 is a flowchart illustrating the manner in which a residue signal is generated for a preamble portion according to an aspect of the present invention. Again, the flowchart is described with respect to FIG. 1, and in relation to wireless device 110A, merely for illustration. While wireless device 110A is assumed to operate consistent with the 802.11 a/g WLAN standard, various features can be implemented in other environments and using other components as well. Furthermore, the steps are described in a specific sequence merely for illustration. The flowchart starts in step 301, in which control passes immediately to step 310.

In step 310, wireless device 110A receives an input signal representing a preamble portion of a packet, with the preamble portion containing training symbols. The input signal, may, in addition contain an interference component. Training symbols are generally predetermined (and known to a potential receiver) symbols used to enable a receiver to estimate channel characteristics (corresponding to each sub-carrier of a 802.11 WLAN signal) of the wireless medium. The training symbols (or their characteristics) are typically specified by the wireless standard (e.g., 802.11a/g). Control then passes to step 320.

In step 320, wireless device 110A removes the frequency components representing the training symbols from the input signal to produce a residue signal. Such frequency components may be determined by examining the input signals, and an example approach for such determination is described in sections below. The residue signal may be viewed as an estimate of the interference signal. Control then passes to step 330.

Steps 330 and 340 respectively operate similar to steps 230 and 240, except that steps 330 and 340 operate on the residue signal generated in step 320. The related description is not repeated in the interest of conciseness. The flowchart ends in step 399.

The approach of FIG. 3 can be implemented in various environments, and is illustrated next with an example.

5. Filtering Channel Estimation Parameters in Frequency Domain

In an embodiment, wireless device 110A implements step 320 by computing channel estimates by processing training symbols contained in the preamble portion, and then determines the frequency components representing the training symbols based on the channel estimates. Both these sub-steps can be performed in a known way. The approach is illustrated in further detail below with examples.

Figure 4:
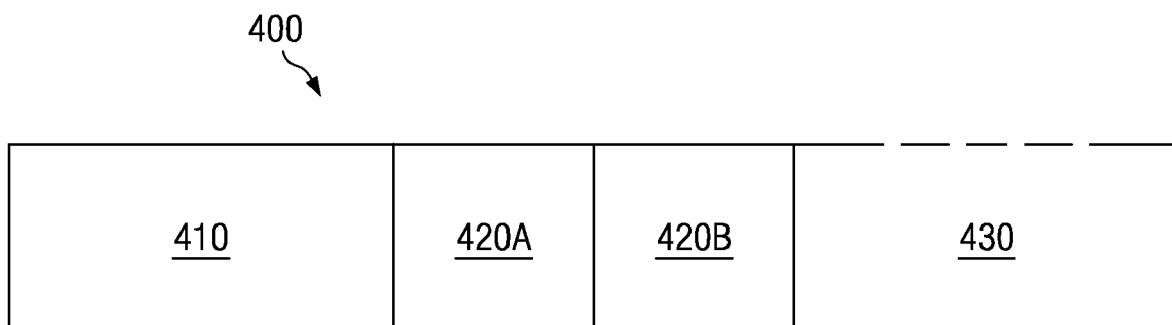
FIG. 4 illustrates the format of a packet received by a wireless device in an embodiment.

FIG. 4 illustrates the format of an example packet received by wireless device 110A operating in the context of WLAN 802.11 a/g standard. Packet 400 is shown containing fields 410-430. Field 410 represents a first preamble according to the 802.11 a/g specification. Field 420 represents a second preamble according to the 802.11 a/g specification. Each of sub-fields 420a and 420b contain the same information, and thus field 420 contains a repeated sequence. Although not shown, a guard interval to minimize the effects of inter-symbol interference may also be present between fields 410 and sub-field 420a. Field 430 represents a payload portion of packet 400.

As described above, according to a first approach wireless device 110A may receive the portion of packet 400 represented by field 420b.

Assuming the training symbols (signal of interest in this example) are represented by ln (for values of n=0 to N−1, N being the number of sample points used by wireless device 110A in one symbol, or DFT-frame period), the received signal (input signal) 420b may be written as:

$$r_n = l_n \otimes h_n + w_n + z_n \quad \text{Equation 1}$$

wherein $l_n$ represent the samples of transmitted training sequence in time domain, $r_n$ represent the input signal 420b, $h_n$ represents the combined impulse response of the transmit filter (in the transmitter of the packet), receive filter (in wireless device 110A) and the multipath channel, $w_n$ represents noise, which may be additive white Gaussian, $z_n$ represents a narrowband interference component, and $\otimes$ represents a circular convolution operation.

It is noted here that linear convolution in the context of a wireless multi-path channel (such as the environment of FIG. 1) is converted into circular convolution by use of cyclic prefix in the transmitted signal.

The received training symbols $r_n$ (as given in equation 1) are distorted by the channel, noise and interference (if present).

Performing a Fourier transform (FFT) operation to convert represent equation 1 in the frequency domain provides:

$$R_k = L_k H_k + W_k + Z_k, \; k = -26, \ldots, -1, +1, \ldots, +26 \quad \text{Equation 2}$$

wherein, index k represents the 52 tones (henceforth termed as sub-carriers or sub-channels) contained in input signal 420b.

$L_k$ is the frequency domain training sequence symbol, which is used for channel estimation $H_k$ are the channel coefficients as seen by the kth sub-channel, $W_k$ and $Z_k$ are respectively the noise and interference component ($w_n$ and $z_n$ in equation 1) as seen in frequency domain (obtained by computing the corresponding FFT).

Wireless device 110A obtains a 'raw' estimate of the channel parameters by dividing Rk by Lk:

$$\hat{H}_k = \frac{R_k}{L_k} = H_k + W_k L_k + Z_k L_k \quad \text{Equation 3}$$

Since $L_k$ may take on values of +1 or −1 only (or in general known a priori based on the wireless standard), it may be noted that the operation represented by equation 3 may be performed by multiplying by $L_k$ also.

An inverse Fourier transform (IFFT) of equation 3 provides:

$$\hat{h}_n = h_n + \tilde{w}_n + \tilde{z}_n, \; n = 0, 1, \ldots, N-1 \quad \text{Equation 4}$$

wherein, $\tilde{w}_n = w_n \otimes l_n$ and $\tilde{z}_n = z_n \otimes l_n$

Figure 5A:
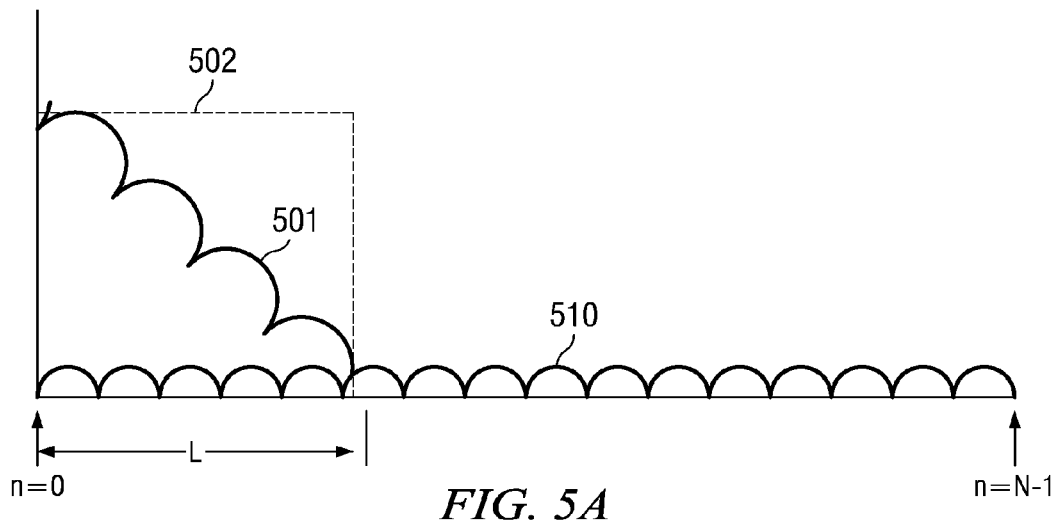
FIGS. 5A-5C are diagrams used to illustrate the manner in which narrowband interference is removed from an input signal in an embodiment.

FIG. 5A represents equation 4 graphically. Waveform 501 represents the term $h_n$, waveform 510 represents the terms $\tilde{w}_n = w_n \otimes l_n$ and $\tilde{z}_n = z_n \otimes l_n$ in combination.

It may be noted that length/duration (L) of $h_n$ is less than N. The quality of the channel estimates can be improved if the noise and interference samples are removed from the raw estimate given by equation 4. Since windowing in time domain is equivalent to filtering in frequency domain, wireless device 110A filters, in the frequency domain, the raw channel estimates represented by equation 4. The filtering can be performed in a known way.

Window 502 in FIG. 5A represents the corresponding window in the time domain. The channel length L in FIG. 5A, (also termed Channel Rank) may be estimated using the preamble, and a worst-case (longest) channel length may typically be used for the value of L. Typically, standards (such as WLAN 802.11) define the channel model enabling a computation of L.

Denoting the filtered channel estimates as $\hat{H}_k$, and assuming perfect windowing in time domain, IFFT of the filtered channel estimates can be written as:

$$\hat{h}_n = h_n + \tilde{w}_n + \tilde{z}_n, n = 0, \ldots, L$$
$$= \tilde{w}_n + \tilde{z}_n, n = L+1, \ldots, N-1$$

Equation 5

Defining the channel estimation error as $e_n = \hat{h}_n - h_n$ i.e., subtracting equation 4 from equation 5 provides:

$$e_n = 0, n = 0, \ldots L$$
$$= \tilde{w}_n + \tilde{z}_n, n = L+1, \ldots, N-1$$

Equation 6

Figure 5B:
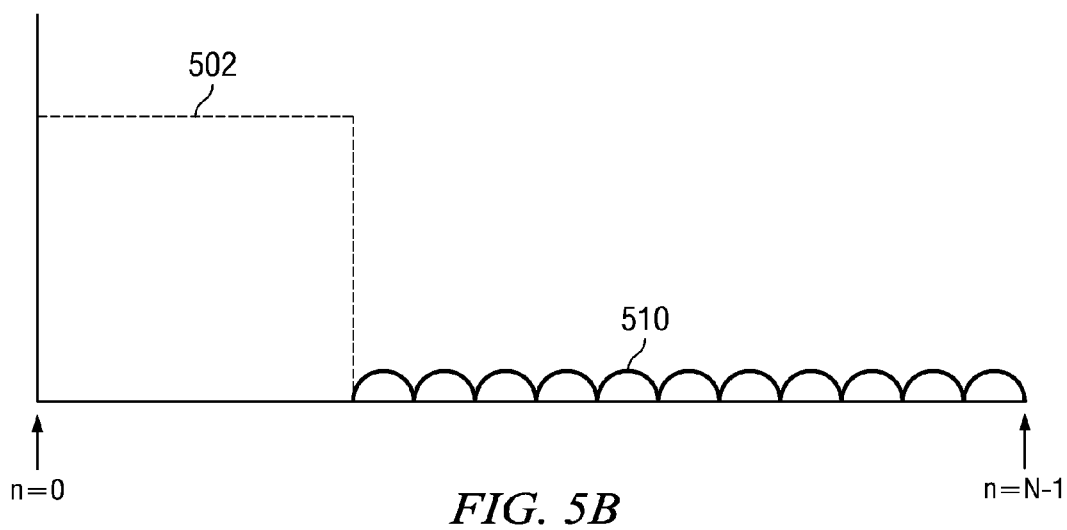

The channel estimation error as given by equation 6 is depicted in FIG. 5B, where the error is represented in the time domain. It may be noted that the error may include only the narrowband interference and the noise. Since the noise power is generally much below the interference power, FFT of equation 6 will clearly show presence (or absence) of the narrowband interference component. The frequency domain equivalent of the error can be obtained by taking a FFT of Equation 6 above or can be obtained as:

$$\hat{E}_k = \hat{H}_k - H_k$$

Equation 7

Figure 5C:
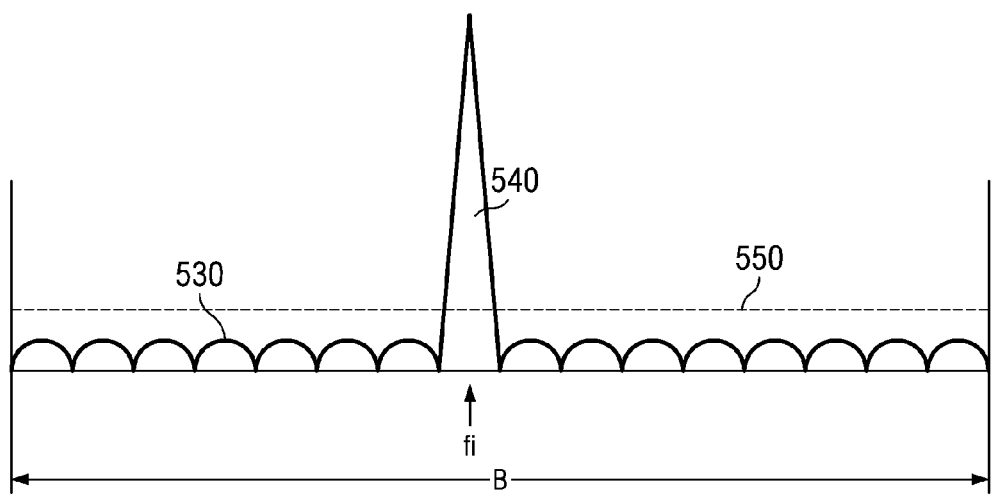

The channel estimation error as given by equation 7 is depicted in FIG. 5C, and represents a residue signal in which the signal of interest has been removed. Wireless device 110A checks if the residue signal contains portions within the band of interest (denoted by B) that have a power level greater than a threshold value, denoted by 550). Assuming an interference signal is present in the input signal, the interference shows up as waveform 540. Wireless device 110A may note the frequency (or band of frequencies) fi of the interference component 540, and remove the component from the input signal.

The example approach described above determines presence of interference in the preamble using operations in the frequency domain. An example approach used to detect interference in the preamble by operating in the time domain is described next with a flowchart.

6. Alternative Approach to Detecting Interference Signal in the Preamble

Figure 6:
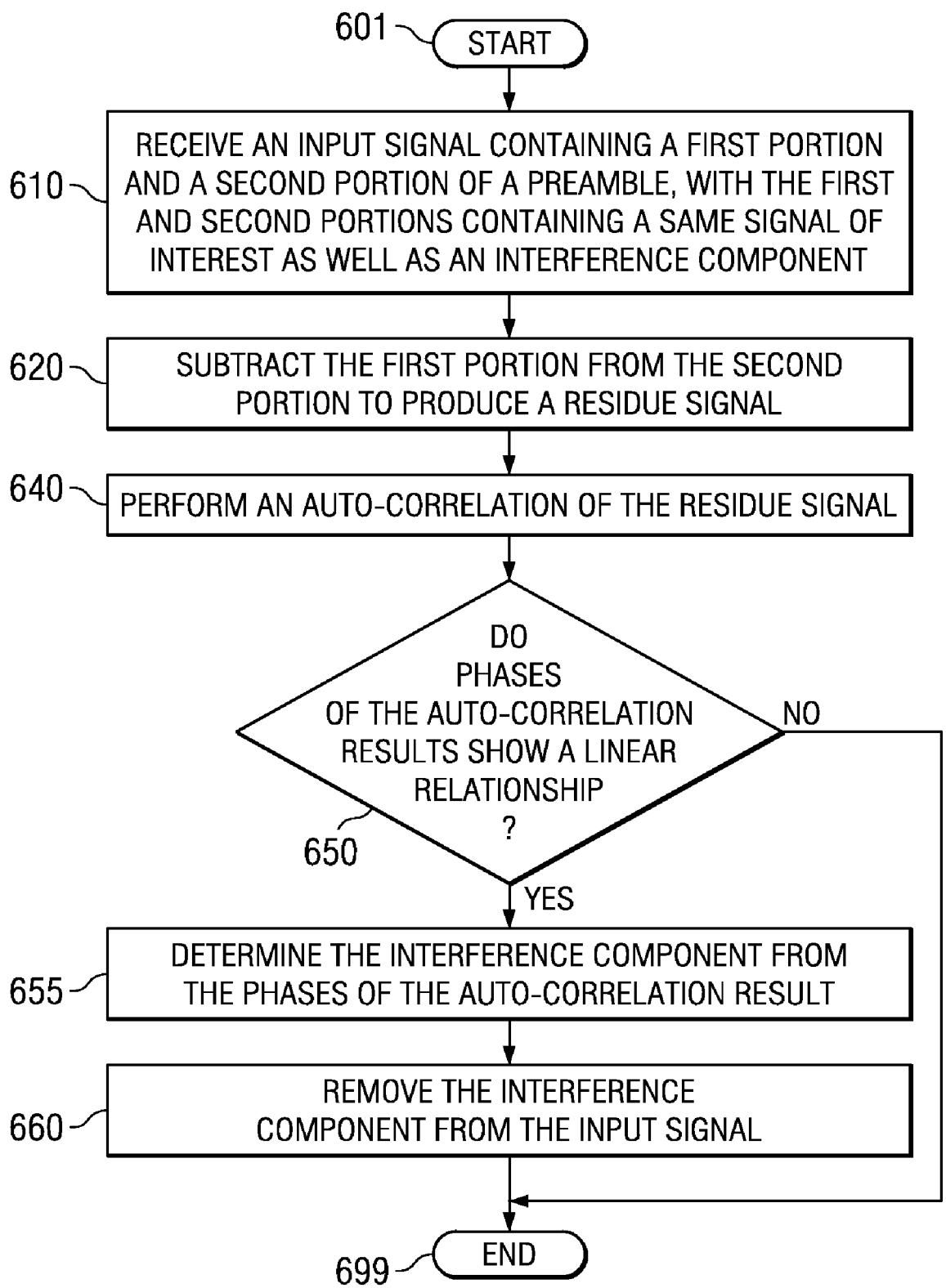
FIG. 6 is a flowchart illustrating the manner in which narrowband interference during a preamble portion of a packet is removed in an alternative approach according to several aspects of the present invention.

FIG. 6 is a flowchart illustrating another approach by which narrowband interference may be detected (and removed) in the preamble of a packet according to the present invention. Again, the flowchart is described with respect to FIG. 1, and in relation to wireless device 110A, merely for illustration. While wireless device 110A is assumed to operate consistent with the 802.11 a/g WLAN standard, various features can be implemented in other environments and using other components as well. Furthermore, the steps are described in a specific sequence merely for illustration. The flowchart starts in step 601, in which control passes immediately to step 610.

In step 610, wireless device 110A receives an input signal containing a first portion and a second portion of a preamble, with the portions having equal time durations and containing the same signal of interest (training symbols). The first portion and the second portion are assumed to be received in that order merely for illustration. In addition, an interference component may also be present in the input signal. Control then passes to step 620.

In step 620, wireless device 110A subtracts the first portion from the second portion to produce a residue signal. It may be appreciated that the subtraction removes the signal of interest since both portions encode (contain) the same signal of interest. Assuming that an interference component (if present) has a frequency other than an integral multiple of the inverse of the time period of the first (or second) preamble portion, the residue signal would contain the narrowband interference signal sought to be detected. Control then passes to step 640.

In step 640, wireless device 110A performs an autocorrelation operation of the residue signal to generate multiple autocorrelation values (for corresponding time delays). Autocorrelation generally refers to a technique to determine the similarity among different portions of a signal, and may be performed, for example, by multiplying a signal with a time delayed version of the signal at different time instances, and summing the products, as is well known in the relevant arts. Each of the multiple autocorrelation values has a corresponding phase. Control then passes to step 650.

In step 650 wireless device 110A, determines whether the phases of the auto-correlation results show a linear relationship, i.e., represent a straight line. In general, assuming an interference component is present in the input signal, phases of the autocorrelation values show a linear relationship. On the other hand, assuming no interference component is present, and instead only low power noise components are present in the input signal, the phases of the autocorrelation values may show a non-linear (for example, random) distribution.

If the phases show a linear relation ship, control passes to step 655, else control passes to step 699, in which the flowchart ends. It should be appreciated that steps 640 and 650 together represent an example implementation of step 230.

In step 655, wireless device 110A determines the interference component (interference bands in general, consistent with the description of FIG. 2 above) from the phases of the autocorrelation values. Generally, the slope of the straight line represented by the phases of the autocorrelation values represents a frequency of the interference component. Control then passes to step 660.

In step 660, wireless device 110A removes the interference component from the input signal. Wireless device 110A may note from step 655, the frequency occupied by the interference component, and removes the corresponding frequency from the input signal. Alternatively, other approaches may be used as described below. Control then passes to step 699, in which the flowchart ends.

The description above is illustrated next in greater detail with an example.

7. Time Domain Processing

The input signal (received preamble signal—fields 420a and 420b in combination) may be denoted by:

$$r_n = Al_n e^{j2\pi\Delta fn} + Bw_n + Cz_n, n = 0, 1, \ldots, 255$$

Equation 8 wherein, $l_n$ represents the preamble sequence (signal of interest) contained fields 420a and 420b, and obtained after being passed through transmit filters (in a transmitter of the preamble), multi-path channels (wireless medium) and receive filters (in wireless device 110A), n represents a sample number; 256 samples being taken of the input signal, 128 samples each corresponding to fields 420a and 420b, $\Delta f$ is the carrier frequency offset, normalized by the sampling frequency, $w_n$ represents low-power noise (e.g., additive white Gaussian noise), $z_n$ represents a narrowband interference component, and assumed to be representable as $e^{\wedge}(j2*pi*f*t)$, wherein f is the normalized frequency of the narrowband interferer, and A, B, and C are coefficients representing the strengths of the corresponding terms.

The sequence represented by $l_n$ is periodic with periodicity of 3.2 microseconds (3.2 microseconds being the length/duration of each of fields 420a and 420b) or 128 samples (assuming the input signal is sample at a rate of 40 Megahertz, the difference $x_n$ of the signal contained in field 420a and the signal contained in field 420b may be represented as:

$$x_n = r_{n+128} - r_n \quad n = 0, 1, \ldots, 127 \quad \text{Equation 9}$$
$$= Al_n e^{j2\pi\Delta fn}(e^{j2\pi\Delta f 128} - 1) + B(w_{n+128} - w_n) +$$
$$Ce^{j2\pi fn}(e^{j2\pi f 128} - 1)$$

Assuming the carrier frequency offset (difference between the carrier frequency of the transmitter and the carrier frequency of the receiver) is zero, $x_n$ may be provided as given below:

$$\Delta f=0, \; x_n = Ce^{j2\pi fn}(e^{j2\pi f 128}-1) + B(w_{n+128}-w_n) \quad \text{Equation 10}$$

Thus, when carrier frequency offset is zero, $x_n$ represents the interference signal.

It is noted here that $x_n$ of equation 10 represents the interference signal only if the normalized interference frequency is not a multiple of 1/128 MHz=312.5 kHz, 312.5 KHz being the inverse of the time period of each of fields 420a and 420b.

When the received (input) signal has a non-zero carrier frequency offset, the interference frequency also has a corresponding offset.

From equation 10, narrowband interference-to-noise ratio in Equation (9) can be written as follows:

$$\text{Interference-to-noise-ratio} = \frac{C^2 |e^{j2\pi f 128} - 1|^2}{2B^2 + A^2 |e^{j2\pi\Delta f 128} - 1|^2} \quad \text{Equation 11}$$

Assuming $\Delta f$ to be the residual frequency offset after coarse and fine frequency offset correction, and its value to be small, the term $|e^{j2\pi f 128}-1|^2$ is also very small.

Autocorrelation Rm of $x_n$ may be computed as:

$$R_m = \sum_{n=0}^{63} \text{sign}(x_n)\text{sign}(x_{n+m}^*) \quad m = 0, 1, \ldots, 24 \quad \text{Equation 12}$$

wherein, $\text{sign}(x_n) \in \{\pm 1 \pm j\}$ is a complex number with sign of real and imaginary parts of $x_n$ as its real and imaginary parts, respectively.

$R_m$ is an approximation of the autocorrelation of $x_n$, computed using only the sign of the respective $x_n$ values.

It is noted here that using only the sign of the $x_n$ values (as against sign and magnitudes) simplifies computational complexity, while still enabling reliable detection of the interference signal.

It may be shown that when x, denotes a pure sinusoidal tone of frequency fHz (normalized with sampling rate), autocorrelation $R_m$ in such a case may be expressed as given below:

$$R_m = 64 e^{j2\pi m f} \quad \text{Equation 13}$$

In this case, the phase of $R_m$, when plotted with respect to index m, forms a straight-line with slope $2\pi f$.

Figure 7:
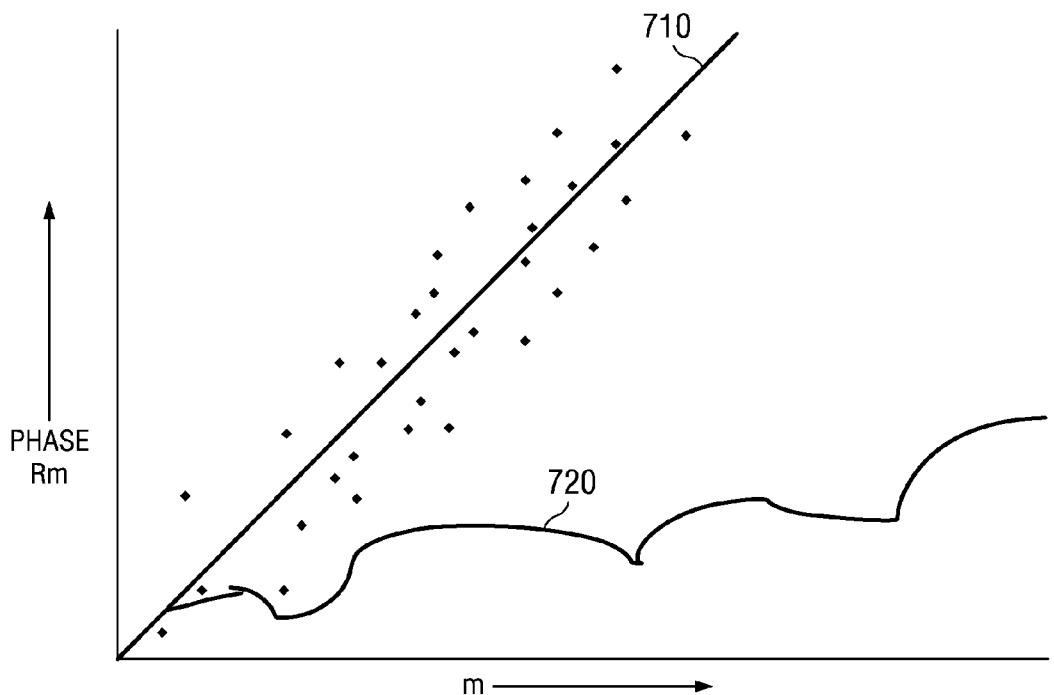
FIG. 7 is a diagram used to illustrate the manner in which narrowband interference is removed from an input signal in the alternative embodiment noted above.

However, if the narrowband interferer is corrupted by noise as well, the phases of $R_m$ deviate from a straight line due to the noise (and other non-ideal effects). In an embodiment of the present invention, a least squares fit of the phases is performed to provide an estimate of the interference frequency f, as depicted in FIG. 7, in which line 710 represents the straight line obtained by using a least-squares fit operation on the phases of $R_m$ represented by the dots in FIG. 7. FIG. 7 is shown merely to illustrate the least squares fit operation, and typical distribution of phase values may differ from those shown.

When no interference signal is present, phases of $R_m$ will not form a straight-line, yielding a very high "least-squares fit error", a scenario depicted by the curve 720 in FIG. 7. On the other hand, when an interference signal is present the error will be small as may be observed from FIG. 7.

The phase angles of each autocorrelation value $R_m$ is given by:

$$A_m = 2\pi fm, \; m=0, 1, \ldots, 24 \quad \text{Equation 14}$$

A cost function for an estimate of frequency f may be defined as:

$$J = \sum_{m=0}^{24} |A_m - 2\pi fm|^2 \quad \text{Equation 15}$$

Minimizing the cost function J, by differentiating J with respect to F and setting the result to zero provides:

$$\hat{f} = \frac{1}{2\pi \sum\limits_{m=0}^{24} m^2} \sum_{m=0}^{24} m A_m \quad \text{Equation 16}$$

which is approximately equal to the expression below:

$$\approx \frac{107}{2\pi 2^{19}} \sum_{m=0}^{24} m A_m \quad \text{Equation 17}$$

For ease of computation, the least-squares fit error may be defined as given below:

$$E = \sum_{m=0}^{24} |A_m - 2\pi \hat{f} m| \quad \text{Equation 18}$$

When an interference signal (a complex sinusoidal interference spur) is present in the input signal, the value of E (with a corresponding threshold for E generally determined empirically using simulations) will be small and f̂ (as given by equation 17) will be an estimate of the frequency of the interference signal. The value of E below which on the other hand, in absence of any interference, value of E will be high.

The approaches described above operated on preamble portions of a packet to detect interference. However, interference may be present (potentially a different interference signal from those present during a preamble portion) even during subsequent portions of a packet in which data (information desired to be communicated, as against headers, training symbols etc.) is transmitted, referred to as a payload portion. Various aspects of the present invention enable detection of interference signals present in a payload portion of a packet, as illustrated next with respect to a flowchart.

8. Detecting Interference in a Payload Portion of a Packet

Figure 8:
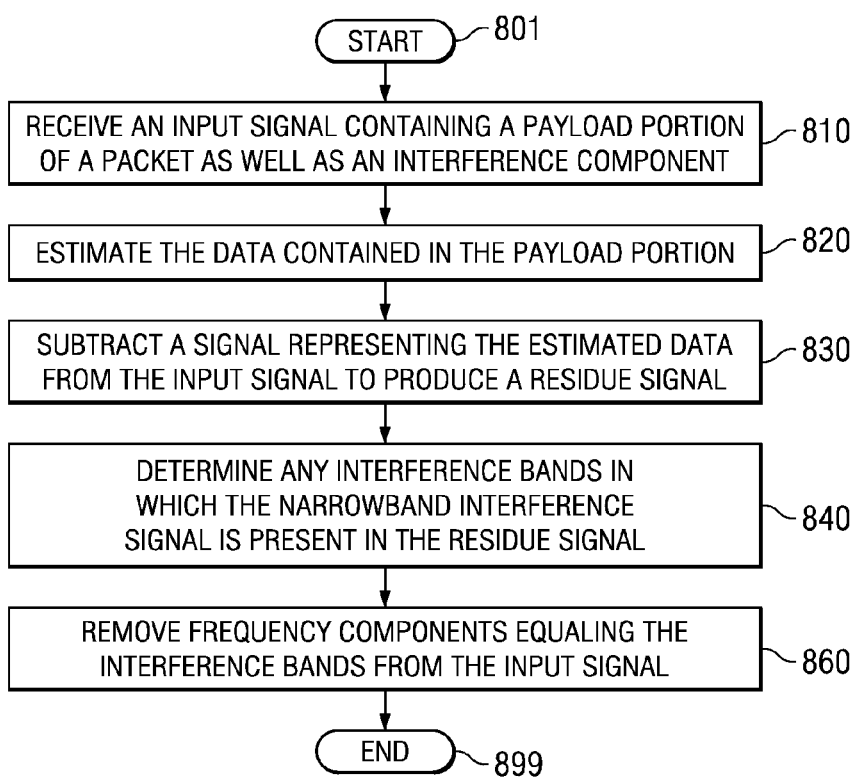
FIG. 8 is a flowchart illustrating the manner in which narrowband interference during a payload portion of a packet is removed according to several aspects of the present invention.

FIG. 8 is a flowchart illustrating the manner in which interference in payload portion of a packet may be detected and removed according to an aspect of the present invention. Again, the flowchart is described with respect to FIG. 1, and in relation to wireless device 110A, merely for illustration. While wireless device 110A is assumed to operate consistent with the 802.11 a/g WLAN standard, various features can be implemented in other environments and using other components as well. Furthermore, the steps are described in a specific sequence merely for illustration. The flowchart starts in step 801, in which control passes immediately to step 810.

In step 810, wireless device 110A receives an input signal representing a payload portion of a packet. The input signal, may, in addition contain an interference component. Control then passes to step 820.

In step 820, wireless device 110A computes an estimate of the data contained in the payload portion of the received signal. It may be appreciated that the presence of low-power noise and interference signals in the received signal may cause a change in the characteristics (e.g., amplitude/phase) of the signal representing the data (signal of interest) from normal values.

For example, data transmitted in the form of QPSK (quaternary phase shift keyed) signals may have predetermined phase and amplitudes for each possible value (symbol). Deviation from the predetermined characteristics (which are known beforehand to wireless device 110A) may represent effects due to a combination of interference and noise. In an embodiment, wireless device 110A performs a quantization (slicing) procedure, described below, to estimate the data values. Control then passes to step 830.

In step 830, wireless device 110A subtracts the estimate of the data from the input signal to produce a residue signal. It may be appreciated that the residue signal may contain only noise and interference component, with the noise having much lower power as compared to the interference (if present). Control then passes to step 840.

Steps 840 and 860 respectively operate similar to steps 230 and 240, except that steps 840 and 860 operate on the residue signal generated in step 830. The flowchart ends in step 899.

The approach of FIG. 8 can be implemented in various environments, and is illustrated next with an example.

9. Payload processing

A narrowband interferer that appears after long training sequence (preamble 420 of FIG. 4) does not affect channel estimates, but may affect some sub-channels in the received signal (and contained in the payload represented by field 430 in FIG. 4) by directly interfering with the data/symbols.

Error (also termed Error Vector Magnitude—EVM) on the affected sub-channels may thus be higher than in the rest of the sub-channels. Therefore, if EVM is computed on each sub-channel independently and averaged across time (across symbols), presence of narrowband interference will produce a peak when "per-tone EVM' is plotted against sub-channel index.

The "per-tone" EVM is defined as:

$$\tilde{e}_{k,n} = \left| \frac{x_{k,n}}{\hat{h}_k} - Q\left(\frac{x_{k,n}}{\hat{h}_k}\right) \right| \qquad \text{Equation 19}$$

$$e_{k,n} = (1-\mu)e_{k,n-1} + \mu\tilde{e}_{k,n} \qquad \text{Equation 20}$$

wherein, k is the sub-carrier index, n is the OFDM symbol index, $x_{k,n}$ is a data value (after performing an FFT on the 802.11 a/g input signal) corresponding to kth sub-carrier and nth symbol, the term $(1-\mu)$ is a programmable number that is close to 1 in magnitude, but less than 1.

For example, $(1-\mu)$ could be equal to 0.99.

$\hat{h}_k$ is the channel estimate for the kth sub-channel, and may be obtained by processing preamble sequence in fields 420a and 420b shown in FIG. 4, the term $Q[x_{k,n}/\hat{h}_k]$ in equation 19 represents a quantization operation noted above.

Figure 9:
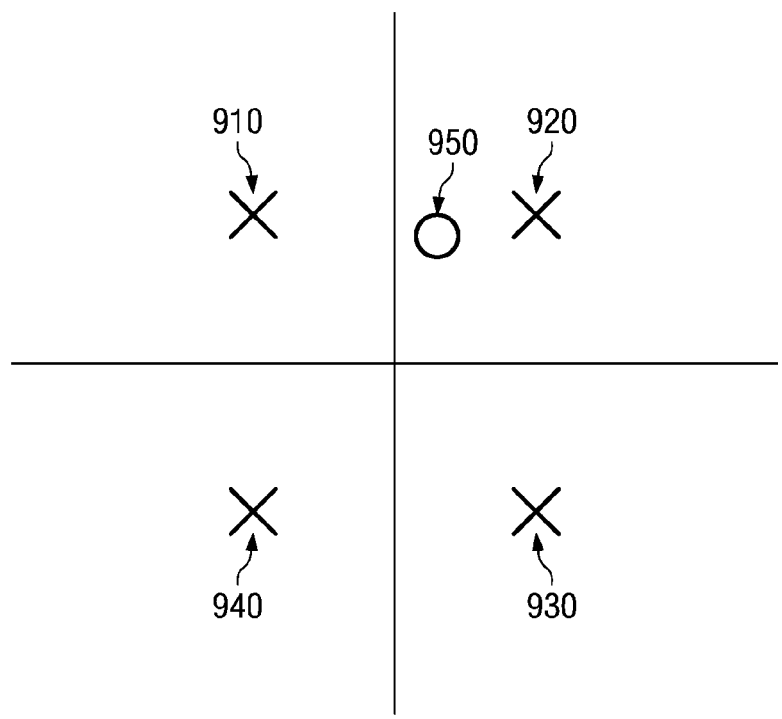
FIG. 9 is a diagram used to illustrate the manner in which narrowband interference during a payload portion of a packet is removed in an embodiment.

To illustrate with respect to FIG. 9, assuming each of the received data values $x_{k,n}$ is a QPSK modulated value, four values are possible (and known to wireless device 110A) as represented by points 910-940 in a polar co-ordinate representation.

Assuming a data value represented by point 950 in FIG. 9 is received, wireless device 110A 'quantizes' (or slices) the data value to point 920 (point 920 being thus an estimate of point 950). The error between points 950 and 920 (as given by equation 19) may represent an effect due to an interference signal.

In general, wireless device 110A may quantize a received data value $x_{k,n}$ by selecting the nearest (least in error) of the 4 predetermined values represented by points 910-940. Errors as given by equation 19 corresponding to each sub-carrier may be averaged over time.

A detection metric may be derived as follows:

$$E_{k,n} = |\mathcal{R}\{e_{k,n}\}| + |\mathcal{I}\{e_{k,n}\}| \qquad \text{Equation 21}$$

$$E_{\max} = \max_k\{E_{k,n}\}, \; E_{\max} = E_{k_{\max},n}$$

$$M = \underset{k, k \neq k_{\max}}{mean}(E_{k,n})$$

$$D = \frac{E_{\max}}{M}$$

wherein, $e_{k,n}$ denotes the time-averaged per-tone EVM for sub-channel k, at symbol index n.

The expressions in equation 21 illustrate a technique to detect the presence of a peak among $\{e_{k,n}\}$ across sub-carriers. $E_{k,n}$ is a form of absolute value of $e_{k,n}$ which is otherwise a complex number. Then, maximum value of $E_{k,n}$ across all sub-channels, i.e., all k is found. The sub-carrier index for which maximum $E_{k,n}$ occurs is denoted as $k_{max}$. Then, mean of all $E_{k,n}$ for a fixed n and all values of k, except for $k_{max}$, is computed. Ratio of the computed mean and $E_{max}$ represents the detection metric. If this detection metric is greater than a threshold, then a narrowband interference is deemed to be detected, with the frequency of the narrowband interference signal being equal to that of sub-channel $k_{max}$.

If the value of the metric D as given by equation 21 is greater than a threshold value, wireless device 110A concludes that an interference signal is present An interference signal detected using the approaches above may be removed by removing a frequency (or band of frequencies) components corresponding to the interference band of the interference signal directly from the input signal in a known way.

Alternatively (or in addition), with respect to the approach of FIG. 8, wireless device 110A may set the channel estimate magnitudes of the interference-affected bins (frequencies or frequency bands) to zero. Therefore, a Viterbi decoder in wireless device 110A which may be used to optimally estimate the corresponding symbol values assigns lowest reliability to decisions on these bins. As a result robustness of the Viterbi decoder to narrowband interferer is increased.

With respect to the approaches of FIGS. 3 and 6, wireless device 110A may filter the channel estimates with a P-tap filter to improve the quality of the channel estimates. However, if a sub-channel is corrupted by narrowband interference, the raw channel estimates for that sub-channel will also be corrupted. In addition, the P-tap filtering may spread the narrowband interference across (P−1) neighboring sub-channels, thus affecting the channel estimates on those sub-channels also. Therefore, in addition to removing the bins directly affected by the interference signal, wireless device 110A may not use the channel estimation averaging filter on the (P−1) neighboring bins.

Wireless device 110A may contain various processing blocks implemented to provide features in accordance with several aspects of the present invention as described above, and the description is continued with details of an example implementation.

10. Processing Blocks

Figure 10:
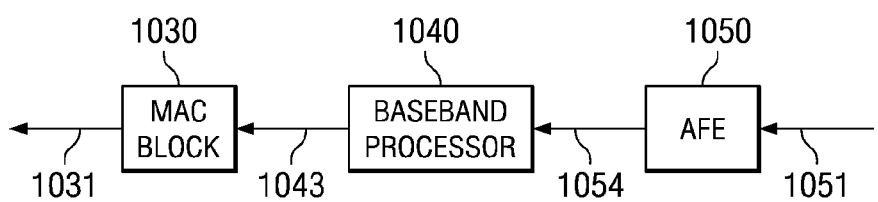
FIG. 10 is a block diagram illustrating the details of processing blocks in a wireless device in an embodiment implemented according to several aspects of the present invention.

FIG. 10 is a block diagram of a portion of wireless device 110A in an embodiment of the present invention. The diagram is shown containing MAC block 1030, baseband processor 1040 and analog front-end (AFE) 1050. Only receive signal paths are shown in FIG. 10, but transmit paths (and transmit operations as well as control paths) may also be present and are not shown or described as not being relevant to an understanding of the features sought to be illustrated. Further, internal details of wireless device 110A are shown in the context of 802.11 a/g WLAN standard merely for illustration. However, wireless device 110A may be implemented in other contexts/environments as well. Each block of FIG. 10 is now described.

MAC block 1030 receives demodulated (and processed) WLAN packets from baseband processor 1040 on path 1043, and performs 802.11 a/g MAC functions, which may include access protocol, receive (RX) processing, and wired-equivalent privacy (WEP) decryption. MAC block 1030 provides processed data from WLAN packets on path 1031 to a host CPU (not shown).

AFE 1050 receives on path 1051 a signal from a wireless medium via an antenna and a radio receiver (not shown, but which may also be contained in wireless device 110A). The signal received on path 1051 may represent packet 400 shown in FIG. 4, and may in addition contain interference signals noted above. AFE 1050 may perform operations such as amplification, filtering, signal conditioning and analog to digital (A/D) conversion of signal 1051, and forward the corresponding digital codes to baseband processor 1040 via path 1054.

Baseband processor 1040 performs various operations such as demodulation of digital codes (corresponding to WLAN packets) received from AFE 1050, decoding and descrambling of data, physical-layer convergence protocol (PLCP) generation, clear-channel assessment (CCA) calculation and antenna diversity etc., consistent with the specific protocol and standards (802.11 a/g in the example embodiment of FIG. 10). Baseband processor 1040 forwards the processed packets to MAC block 1030 on path 1043.

In particular, baseband processor 1040 operates to detect and remove interference signals according to the approaches described above. The processing blocks described above may be incorporated in a device/system, an example embodiment of which is described next.

11. System/Device

Figure 11:
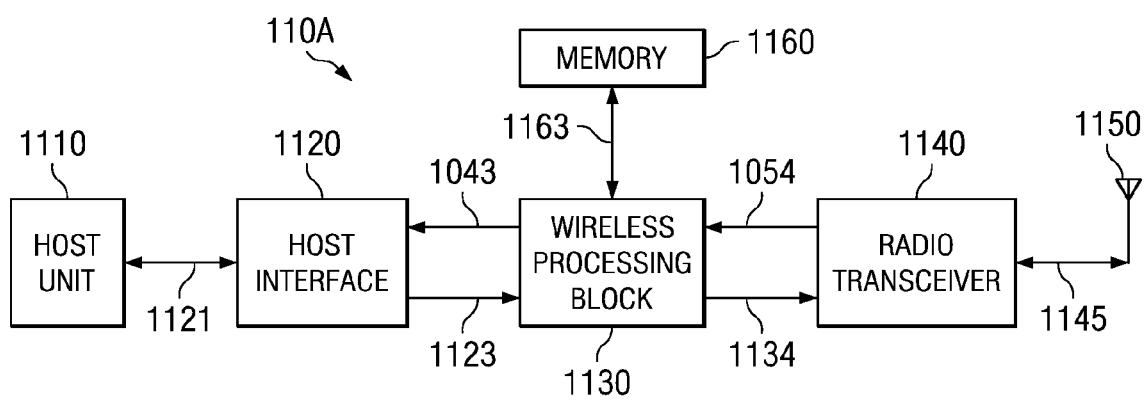
FIG. 11 is a block diagram of a system/device in an embodiment implemented according to several aspects of the present invention.

FIG. 11 is a block diagram of wireless device 110A in an embodiment, and may correspond to a personal digital assistant (PDA), mobile phone, etc. Wireless device 110A is shown containing host unit 1110, host interface 1120, wireless processing block 1130, radio transceiver 1140, antenna 1150, and memory 1160. Each component/block is described below.

Host unit 1110 may contain one or more processing units, memory and other hardware/firmware to provide desired features. In general, host unit 1110 receives data (contained in each payload portion of a packet) from path 1043/1121 and processes the data to provide various applications used by a user. For example, host unit 1110 may be designed to provide features of a PDA, mobile phone, etc. Host unit 1110 may also send data via host interface 1120 (paths 1121 and 1123) to wireless processing block 1130 for transmission.

Host interface 1120 provides the interface between wireless processing block 1130 and host unit 1110 for sending (path 1123) and receiving data (path 1043).

Radio transceiver 1140 provides radio receiver operations for data packets received in RF form from antenna 1150 and forwards the received RF signal to wireless processing block 1130 on path 1054. Radio transceiver 1140 also provides radio transmitter operations for data (packets) received from wireless processing block 1130 on path 1134 and transmits corresponding RF signals via path 1145 and antenna 1150.

Wireless processing block 1130 represents blocks 1030, 1040, and 1050 of FIG. 10, and may be designed to provide several features of the present invention as described above. Wireless processing block 1130 may recover the data in the payload portion of each received packet and send the data on path 1043 to host unit 1110.

Wireless processing block 1130 may be implemented in hardware or software. In a hardware embodiment, each of constituent blocks 1030, 1040 and 1050 of FIG. 10 may be implemented using custom integrated circuit blocks (ASICs). In a software embodiment, wireless processing block 1130 may be implemented using a processor with some or all of the features of the present invention being operative upon execution of software instructions. The software instructions (as well as data) may be stored in memory 1160 (which may correspond to RAM, ROM, secondary storage media such as hard disk, CD-ROM etc, in general machine readable medium), and executed by a processor.

It should be further appreciated that the determined interference signal is for each symbol (interval) of the received signal. However, as the same interference signal is likely to affect subsequent symbols also, the interference signal once determined can be removed from multiple following symbols (or corresponding signal portions). Thus, the interference signal may need to be determined only for some portions of the input signal and used with respect to several other portions of the input signal as well.

In addition, though the description is provided substantially in terms of a wireless receiver processing a wireless signal, it should be appreciated that several of the features can be implemented in wire-based receivers/systems, as will be apparent to one skilled in the relevant arts by reading the disclosure provided herein.

12. Conclusion

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A method of eliminating a narrowband interference signal in a receiver, wherein said narrowband interference signal is present in a band of interest in which a signal of interest is also present, wherein said signal of interest represents a preamble portion of a packet encoded in said input signal, said method comprising:

receiving an input signal containing said signal of interest and said narrowband interference signal, wherein said preamble portion contains channel-distorted training symbols transmitted by a transmitter of said packet;

subtracting said signal of interest from said input signal to generate a residue signal, wherein said subtracting removes the frequency components representing said channel distorted training symbols from said input signal to produce said residue signal;

determining any interference band in which said narrowband interference signal is present in said residue signal; and removing frequency components corresponding to said interference band from said input signal to eliminate said narrowband interference signal from said input signal.

2. The method of claim 1, wherein said determining comprises examining said residue signal for an interference band having a power level exceeding a pre-determined threshold.

3. The method of claim 1, wherein said subtracting is performed in frequency domain.

4. A method of eliminating a narrowband interference signal in a receiver, wherein said narrowband interference signal is present in a band of interest in which a signal of interest is also present, wherein said signal of interest represents a preamble portion of a packet encoded in said input signal, said method comprising:

receiving an input signal containing said signal of interest and said narrowband interference signal, wherein said preamble portion contains a first portion and a second portion, wherein said signal of interest is designed to be the same in each of said first portion and said second portion;

subtracting said signal of interest from said input signal to generate a residue signal, wherein said subtracting subtracts said first portion from said second portion to generate said residue signal;

determining any interference band in which said narrowband interference signal is present in said residue signal; and removing frequency components corresponding to said interference band from said input signal to eliminate said narrowband interference signal from said input signal.

5. The method of claim 4, wherein said determining comprises:

performing an autocorrelation of said residue signal to generate a plurality of autocorrelation values;

ascertaining whether phases of said plurality of autocorrelation values represent a straight line; and setting a frequency of said narrowband interference signal to equal a slope of said straight line if said plurality of autocorrelation values are determined to represent said straight line.

6. The method of claim 5, wherein said determining comprises:

performing a least squares fit of said phases of said plurality of autocorrelation values to obtain said straight line, wherein said determining determines that said phases of said plurality of autocorrelation values represent said straight line only if an error in said least squares fit is less than a second threshold value.

7. The method of claim 5, wherein said subtracting and said ascertaining are performed in time domain.

8. A method of eliminating a narrowband interference signal in a receiver, wherein said narrowband interference signal is present in a band of interest in which a signal of interest is also present, wherein said signal of interest encodes a symbol in a payload portion of a packet, said method comprising:

receiving an input signal containing said signal of interest and said narrowband interference signal;

subtracting said signal of interest from said input signal to generate a residue signal, said subtracting comprising:
estimating a value of said symbol; and
removing a signal representing said value from said input signal to form said residue signal;

determining any interference band in which said narrowband interference signal is present in said residue signal; and removing frequency components corresponding to said interference band from said input signal to eliminate said narrowband interference signal from said input signal, wherein said symbol is received on a first sub-carrier contained in said signal of interest in a first symbol interval, wherein said subtracting and said removing are performed for each of a plurality of subsequent symbols transported on said first sub-carrier to form corresponding subsequent residue signals, wherein a ratio of a largest residue signal among said residue signal and said subsequent residue signals to an average value of said residue signal and said subsequent residue signals is used to indicate whether said narrowband interference signal is present or not.

9. The method of claim 8, wherein said subtracting is performed in frequency domain.

10. The method of claim 1, wherein said input signal is received over a wireless medium according to 802.11a/g standard.

11. A device comprising:

an analog front end to generate a plurality of digital codes representing the strength of an input signal at corresponding time instances, said input signal containing a signal of interest and a narrowband interference signal, wherein said signal of interest represents a preamble portion of a packet encoded in said input signal, wherein said preamble portion contains channel-distorted training symbols transmitted by a transmitter of said packet;

a processing block operable to:
receive said plurality of digital codes,
subtract said signal of interest from said input signal to generate a residue signal;
determine any interference band in which said narrowband interference signal is present in said residue signal, and remove frequency components corresponding to said interference band from said input signal to eliminate said narrowband interference signal from said input signal, wherein said frequency components representing the channel-distorted training symbols from said input signal to produce said residue signal.

12. A device comprising:

an analog front end to generate a plurality of digital codes representing the strength of an input signal at corresponding time instances, said input signal containing a signal of interest and a narrowband interference signal, wherein said signal of interest represents a preamble portion of a packet encoded in said input signal, wherein said preamble portion contains a first portion and a second portion, wherein said signal of interest is designed to be the same in each of said first portion and said second portion;

a processing block operable to:
  receive said plurality of digital codes,
  subtract said first portion from said second portion to generate a residue signal;
  determine any interference band in which said narrowband interference signal is present in said residue signal, and
  remove frequency components corresponding to said interference band from said input signal to eliminate said narrowband interference signal from said input signal.

13. The device of claim 11, wherein said processor performs an autocorrelation of said residue signal to generate a plurality of autocorrelation values, ascertains whether phases of said plurality of autocorrelation values represent a straight line, and sets a frequency of said narrowband interference signal to equal a slope of said straight line if said plurality of autocorrelation values are determined to represent said straight line.

14. A device comprising:

an analog front end to generate a plurality of digital codes representing the strength of an input signal at corresponding time instances, said input signal containing a signal of interest and a narrowband interference signal, wherein said signal of interest encodes a symbol in a payload portion of a packet;

a processing block operable to:
  receive said plurality of digital codes,
  subtract said signal of interest from said input signal to generate a residue signal;
  estimate a value of said symbol and removes a signal representing said value from said input signal to form said residue signal;
  determine any interference band in which said narrowband interference signal is present in said residue signal, and
  remove frequency components corresponding to said interference band from said input signal to eliminate said narrowband interference signal from said input signal, wherein said symbol is received on a first sub-carrier contained in said signal of interest in a first symbol interval, wherein processor estimates and removes each of a plurality of subsequent symbols transported on said first sub-carrier to form corresponding subsequent residue signals, wherein a ratio of a largest residue signal among said residue signals and said subsequent residue signals to an average value of said residue signal and said subsequent residue signals is used to indicate whether said narrowband interference signal is present or not.

15. The device of claim 11, wherein said input signal is received over a wireless medium and said device operates according to 802.11a/g standard.

16. The method of claim 4, wherein said input signal is received over a wireless medium according to 802.11a/g standard.

17. The method of claim 8, wherein said input signal is received over a wireless medium according to 802.11a/g standard.

18. The method of claim 4, wherein said determining comprises examining said residue signal for an interference band having a power level exceeding a pre-determined threshold.

* * * * *